United States Patent [19]
Shupe

[11] 3,779,631
[45] Dec. 18, 1973

[54] OPTICAL CORRELATOR HAVING A DYE AMPLIFIER FOR AMPLIFYING CORRELATING PORTIONS OF SIGNALS

[75] Inventor: David M. Shupe, Troy, Mich.

[73] Assignee: The Bendix Corporation, Southfield, Mich.

[22] Filed: Dec. 27, 1971

[21] Appl. No.: 212,459

[52] U.S. Cl. ........... 350/162 SF, 307/88.3, 330/4.5, 350/3.5
[51] Int. Cl. ............................................. G06g 9/00
[58] Field of Search ............... 350/3.5, 162 SF; 330/4.5, 8; 307/88.3; 250/71 R

[56] References Cited
UNITED STATES PATENTS

| | | |
|---|---|---|
| 3,640,604 | 2/1972 | Yarnell ................................. 350/3.5 |
| 3,547,509 | 12/1970 | Brandes .............................. 350/3.5 |
| 3,542,452 | 11/1970 | Gerritsen et al. ..................... 350/3.5 |
| 3,371,265 | 2/1968 | Woodbury et al. ................. 307/88.3 |
| 3,629,602 | 12/1971 | Firester .............................. 307/88.3 |

Primary Examiner—Ronald J. Stern
Attorney—John S. Bell et al.

[57] ABSTRACT

An optical correlator in which a Fourier transform signal representing one image, and a Fourier transform holographic interference signal representing another image are projected onto an organic dye cell amplifier. The dye cell amplifier records, or in other words absorbs energy from the holographic interference signal and utilizes the absorbed energy to differentially amplify the Fourier transform signal. The amount of amplification provided to the various portions of the Fourier transform signal is proportional to the degree of correlation between the various portions of the two images.

8 Claims, 4 Drawing Figures

OPTICAL CORRELATOR HAVING A DYE AMPLIFIER FOR AMPLIFYING CORRELATING PORTIONS OF SIGNALS

BACKGROUND OF THE INVENTION

1. Field of the Invention

Optical Correlators.

2. Brief Description of the Prior Art

The optical correlator art is well developed. In one type of optical correlator often called an image-matched filter correlator a partially transparent first image is aligned with a holographic recording of a second image. A lens is disposed between the image and hologram in order to form the Fourier transform of the first image. A light beam is then transmitted through the image and recorded hologram which modulate that beam to provide an intensity distribution output signal that indicates the correlation between the various portions of the image and the pattern stored in the hologram. This image-matched filter correlator provides a relatively high resolution output signal. And, the entire image can be illuminated simultaneously to provide a complete correlation determination for an entire image. The primary drawback of this type of correlator is that it is a very painstaking and time consuming procedure to record a hologram of one stereo image and to align that recorded hologram with another image so that a correlation measurement can be made. It is an object of this invention to provide correlation measurements of the type provided previously by image-matched filter correlators at a much faster rate than those measurements can be provided by prior art correlators.

SUMMARY OF THE INVENTION

The correlator of this invention includes an amplifier for receiving first and second wave energy signals representing first and second images. The amplifier absorbs energy from the first signal and uses the absorbed energy to amplify each portion of the second signal representing a portion of the second image that correlates with a portion of the first image. The degree of amplification provided to various portions of the second beam varies in accordance with variations in the degree of correlation between various portions of the two images. Those portions of the second signal representing portions of the second image that do not correlate with portions of the first image are not amplified.

In the embodiment illustrated herein, the amplifier is an organic dye cell amplifier. This amplifier comprises an organic dye solution such as a rhodamine 6-G solution contained in a transparent cell or housing. The organic dye solution absorbs wave energy at one frequency and uses the absorbed wave energy to amplify wave energy of a different frequency. A Fourier transformed beam of wave energy representing one image and two interfering beams of wave energy providing a Fourier transform holographic interference pattern representing another image are superimposed on each other on one surface of a dye cell amplifier. The interfering beams have frequencies such that they will be absorbed by the dye solution, and the Fourier transformed beam has a frequency such that it will be amplified by the energy absorbed from the interfering beams. Energy absorbed at any one portion of the amplifying dye remains localized for a sufficiently long time to provide a correlation measurement output and is not spread or diffused throughout the dye. The various portions of the Fourier transformed beam striking the amplifier are amplified by an amount proportional to the amount of energy that the molecules of the amplifying dye receiving those portions of the Fourier transformed beam have absorbed from the interfering beams. Because of the localized absorption characteristic of the organic dye, the amplifier amplifies the various portions of the Fourier transformed signal to provide an output that indicates the correlation between the patterns of various portions of one image and the pattern of a predetermined portion of the other image. This predetermined portion of the other image may encompass the entire other image in an embodiment if desired.

The apparatus of this invention provides output correlation measurements very rapidly. Conventional organic dye cell amplifiers have a sufficiently large beam receiving surface to receive the entire superimposed Fourier transformed and holographic interference patterns. The amplifier thus simultaneously amplifies all portions of one signal correlating with portions of the other to very rapidly provide an output image indicating the correlation between two complete images. In addition, the device of this invention is capable of providing a sequence of correlation measurements indicating the correlation between various images at a very fast rate. A dye cell amplifier is capable of receiving different signals every ten nano-seconds and providing outputs indicating the correlation between those signals.

The amplified signal provided by the dye cell amplifier is a high contrast intensity distribution in which the portions of the output distribution representing correlating portions of the two images are readily distinguished from other portions of the output distribution. A very thin embodiment of a dye cell amplifier will provide a very strong output signal that can be readily measured and processed. An amplifying organic dye solution such as rhodamine 6-G solution that has absorbed energy from a first signal can double the intensity of a second received signal for each 100 micron thickness of amplifying material along the direction perpendicular to the receiving surface of that material. A relatively small embodiment of this invention can, therefore, be constructed to provide a strong and unambiguous output correlation signal.

BRIEF DESCRIPTION OF THE DRAWINGS

Further objects, features, and advantages of this invention, which is defined by the appended claims, will become apparent from a consideration of the following description and the accompanying drawings in which:

FIGS. 2, 2a, 2b, 2c respectively show two images and an intensity distribution comprising a correlation function for those two images provided by the apparatus of FIG. 1 that illustrates the operation of that apparatus.

DETAILED DESCRIPTION OF THE PREFERRED EMBODIMENTS

Figure 1:
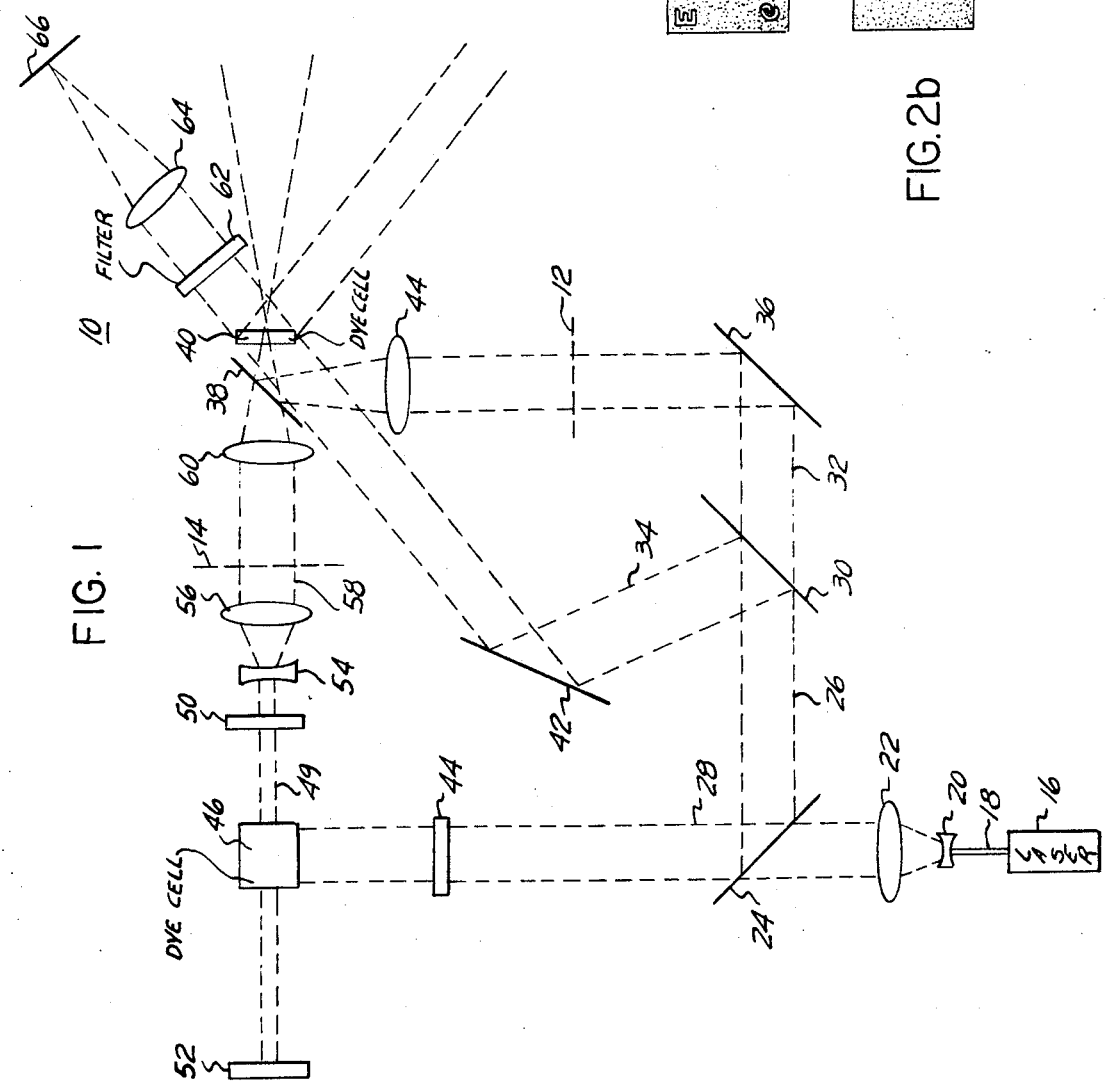
FIG. 1 is a schematic, plan, top view of one embodiment of the correlator of this invention in which an interference pattern representing one image, and a Fourier transform pattern representing a second image are projected onto an organic dye cell amplifier.

FIG. 1 illustrates a correlator 10 for determining the correlation between two partially transparent images 12 and 14. The correlator 10 includes a laser generator 16 that provides a thin beam 18 of coherent laser light. The beam 18 is coherent rather than incoherent so that a holographic interference pattern representing image 12 can be formed. An objective lens 20 and collimating lens 22 are disposed to respectively expand and collimate the thin beam 18. A beam splitter 24 divides the expanded, collimated beam 18 into two beams 26 and 28. A second beam splitter 30 is disposed to receive beam 26 and divide that beam into two beams 32 and 34. A mirror 36 receives beam 32 and directs the beam to strike and be modulated by image 12 so that the modulated beam 32 represents that image. A dichroic beam splitter 38 which reflects wave energy having a frequency equal to that of modulated beam 32 is positioned to receive that beam and direct it toward an organic dye cell amplifier 40. A mirror 42 is positioned to receive beam 34 and direct that beam to interfere with the modulated beam 32 proximate dye cell amplifier 40 to create a holographic interference pattern. A lens 44 is positioned to receive and form the Fourier transform of modulated beam 32 so that the holographic interference pattern representing image 12 projected onto dye cell amplifier 40 comprises a Fourier transform holographic interference pattern. In order to provide such a pattern, lens 44 is positioned so that the amplifying organic dye of the amplifier 40 is located in the back focal plane of that lens.

The device 10 also includes apparatus for projecting the Fourier transform of image 14 onto dye cell amplifier 40. This apparatus includes an organic cell 46 and a cylindrical lens 44 for focusing beam 28 to a line on dye cell 46. Cell 46 comprises an organic dye such as rhodamine 6-G that receives the focused beam 28, and lases to provide a thin output beam 49 having a lower frequency and longer wavelength than beams 28, 32, and 34. Two mirrors 50 and 52 are disposed on opposite sides of dye cell 46 to repeatedly reflect signal 49 through dye cell 46 to cause the intensity of that signal to be increased by harmonic oscillation. Mirror 50 is only partially transparent, and therefore, reflects only a portion of signal 49. A portion of intensified signal 49 is transmitted through mirror 50 to an objective lens 54 and collimating lens 56 which respectively expand and collimate that signal to provide a beam 58 of coherent laser light having a lower wavelength and longer frequency than that of beams 32 and 34.

Image 14 is positioned to receive and modulate beam 58, the modulated beam 58 representing image 14. A lens 60 forms the Fourier transform of the modulated beam 58. Dichroic beam splitter 38 is transparent to light having a frequency equal to that of beam 58 so that the Fourier transformed signal provided by lens 60 is projected onto organic dye cell amplifier 40. The cell 40 is disposed in the back focal plane of lens 60.

Amplifier 40 absorbs energy from the interfering beams 32 and 34 and utilizes the absorbed energy to amplify the portions of modulated, Fourier transformed beam 58 representing portions of image 14 that correlate with portions of image 12. A low pass filter 62 for transmitting energy having a frequency equal to that of beam 58 and for absorbing energy having a frequency equal to that of interfering beams 32 and 34 is positioned downstream from amplifier 40 to block the propagation of any light from the interfering beams that has not been absorbed by amplifier 40. A lens 64 is positioned to receive signals from filter 62 and project the Fourier transform of those signals onto an optical image detector 66. The pattern formed on detector 66 comprises a complete correlation function for images 12 and 14.

In operation, two images 12 and 14 are positioned as illustrated in FIG. 1 to receive and modulate beams 32 and 58, respectively. The images 12 and 14 are properly aligned so that the modulated beams or signals representing images 12 and 14 will superimpose on each other on amplifier 40. Laser generator source 16 is then activated to provide an output which need be nothing more than a short pulse or flash that briefly illuminates images 12 and 14. Dye cell 46 and mirrors 50 and 52 cause modulated beam 58 representing image 14 to have a lower frequency and longer wavelength than that of modulated beam 32 representing image 12. In a particular embodiment, for example, modulated beam 32 representing image 12 may have a wavelength of 4,500 angstroms, and modulated beam 58 representing image 14 may have a wavelength of 6,000 angstroms.

The organic dye contained in the amplifying cell 40 receives a Fourier transform holographic interference pattern formed by beams 32 and 34 that represent image 12 and a Fourier transform pattern representing image 14 that is carried by beam 58. Amplifying cell 40 absorbs energy from beams 32 and 34 and utilizes the absorbed energy to differentially amplify beam 58. The energy absorbed by the amplifying cell 40 from each portion of the holographic interference pattern provided by beams 32 and 34 remains localized. That is, the energy absorbed from a signal striking one point on amplifier 40 will be absorbed and thereby excite only those molecules of the amplifying organic dye solution proximate that point and will have no effect on molecules of the organic dye spaced from that point. The portions of beam 58 striking molecules of the amplifying organic dye material of amplifier 40 that have absorbed energy from interfering beams 32 and 34 will be amplified. The degree of amplification provided to various portions of beam 58 is determined by the correlation between the portions of image 14 represented by those various portions of beam 31 and the pattern of image 12.

Because amplifier cell 40 receives a holographic interference pattern representing image 12, that cell provides a multicomponent output signal. The low pass filter 62, lens 64, and image detector 66 receive the virtual image component of this multicomponent output signal. In other words, these elements are aligned with the projection of beam 34 striking amplifier cell 40. Low pass filter 62 blocks propagation of any portions of the beams 32 and 34 that have not been absorbed by amplifier cell 40 so that the signal downstream from filter 62 comprises an intensity distribution in which the intensity at each point on the distribution is determined by the degree of amplification provided by amplifier 40 to a corresponding point on beam 58. Lens 64 forms the Fourier transform of this intensity distribution and projects that Fourier transform onto the image detector 66. This Fourier transform pattern comprises a complete correlation function of the images 12 and 14 that indicates the degree of correlation between image 12 and each portion of image 14.

Figure 2A:
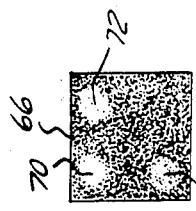
Figure 2B:
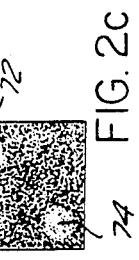
Figure 2C:
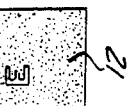

An intensity distribution recorded at detector 66 by correlator 10 that indicates the correlation between images 12 and 14 is illustrated in FIG. 2c. The intensity distribution includes a bright or high intensity spot 70 indicating a complete correlation between the "E's" appearing on images 12 and 14 (FIGS. 2a and 2b); a less bright spot 72 indicating a lesser correlation between the "E" of image 12 and the "L" of image 14; and the very weak spot 74 indicating that there is practically no correlation between the "E" of image 12 and the "e" of image 14. The spots 70, 72, and 74 of the intensity distribution occupy positions on detector 66 corresponding to the positions of the "E", "L", and "e", respectively on image 14. However, each of these spots and letters are displaced from the position of the "E" of image 12. The correlator 10 rapidly provides an output indicating the correlation between patterns occupying different positions on two different images without requiring any scanning or realignment of the images to sequentially align different areas of one image with one area of the other.

Having thus described one embodiment of this invention, a number of modifications will occur to those skilled in the art. The basic concept of this invention can be applied to any prior art system that requires the formation of a hologram as an intermediate step. This invention eliminates the requirement to permanently record a hologram as an intermediate step. As one example of a modification to the preferred embodiment illustrated herein, the image 14 and Fourier transform lens 60 can be placed in beam 34 instead of in beam 58, and the correlator 10 will provide an output indicating the correlation between images 12 and 14.

Therefore, what is claimed is:

1. A device for measuring the correlation between first and second images comprising:
    an organic dye material that absorbs wave energy having a frequency within a predetermined frequency range;
    means for providing a first signal having a frequency within said range;
    means for providing a second signal having a frequency that causes said organic dye material to release absorbed energy at a frequency substantially equal to the frequency of said second signal to thereby amplify said second signal;
    means for directing said first signal to be modulated according to the first image and then absorbed by said organic dye material; and
    means for directing said second signal to be modulated according to the second image and superimposed on said first signal on said organic dye material to release absorbed energy representing portions of said first image in correlation with said second image, said released energy amplifying said second signal by an amount proportional to the correlation between the two images to provide an amplified signal having a value indicating image correlation.

2. The device of claim 1 in which:
    said organic dye material amplifies each portion of said second signal by an amount proportional to the degree of correlation between said first image and the portion of said second image represented by said each portion of said second signal.

3. The device of claim 2 in which:
    said wave energy signal providing means transmit said first and second signals to said organic dye material at substantially the same instant; and said organic dye material simultaneously amplifies all portions of said second signal representing portions of said second image correlating with portions of said first image to thereby rapidly provide an output indicating the correlation between all portions of said first and second images.

4. The device of claim 1 further including filter means for blocking any first frequency signals propagating from said organic dye material.

5. The device of claim 4 in which said wave energy signal providing means include means for providing an interference signal pattern representing said first image and means for providing a Fourier transform signal representing said second image.

6. The device of claim 5 in which:
    said wave energy signal providing means include:
    means for directing a first beam of coherent wave energy having a first frequency to strike and be modulated by said first image;
    means for directing a reference beam of coherent wave energy having a frequency substantially identical to that of said first beam to interfere with said modulated first beam to provide an interference pattern representing said first image;
    means for directing a second beam of wave energy having a frequency different from that of said first beam to strike and be modulated by said second image; and
    means for forming the Fourier transform of said modulated second beam, said Fourier transformed beam being directed to be superimposed on said interference pattern; and
    said amplifying organic dye is positioned to receive said interference pattern and said superimposed, Fourier transformed beam, said organic dye absorbing energy form the beams forming said interference pattern and utilizing said absorbed energy to amplify each portion of said Fourier transformed beam by an amount proportional to the energy of the portion of said interference pattern on which said each portion of said Fourier transformed beam is superimposed.

7. The device of claim 6 further including:
    means for forming the Fourier transform of said modulated first beam to provide a Fourier transform holographic interference pattern; and
    means for forming the Fourier transform of at least a portion of the amplified signal provided by said organic dye solution to provide an output signal comprising an intensity distribution in which the intensity of each portion of said output distribution indicates the correlation between a predetermined portion of said first image and the portion of said second image corresponding to said each portion of said output distribution.

8. The device of claim 6 in which said means for directing a second beam of wave energy having a frequency different from that of said first beam include:
    means for focusing a beam of coherent wave energy having a frequency equal to said first frequency, said focused beam defining a line;
    a sufficient quantity of organic dye material to receive said focused beam to absorb energy from said received beam, and to provide an output signal having a lower frequency and longer wavelength than that of said first beam; and a pair of mirrors for repeatedly reflecting said output signal through said organic dye material to thereby intensify said output signal, one of said mirrors being only partially reflective and partially transparent and thereby permitting a portion of said intensified signal to strike and be modulated by said second image.

* * * * *